United States Patent [19]

Kivioja et al.

[11] Patent Number: 5,580,533
[45] Date of Patent: Dec. 3, 1996

[54] CATALYST AND PROCESS FOR PURIFYING DIESEL EXHAUST GASES

[75] Inventors: Matti Kivioja; Sointu Ravola; Thomas Slotte; Teuvo Maunula; Matti Härkönen, all of Oulu; Pirkko Virta, Vihtavuori, all of Finland

[73] Assignee: Kemira OY, Espoo, Finland

[21] Appl. No.: 318,888

[22] PCT Filed: Apr. 22, 1993

[86] PCT No.: PCT/FI93/00167

§ 371 Date: Oct. 24, 1994

§ 102(e) Date: Oct. 24, 1994

[87] PCT Pub. No.: WO93/22050

PCT Pub. Date: Nov. 11, 1993

[30] Foreign Application Priority Data

Apr. 23, 1992 [FI] Finland ..................................... 921799

[51] Int. Cl.⁶ ...................................................... B01J 8/02
[52] U.S. Cl. ........................ 423/213.5; 502/350; 502/439
[58] Field of Search .................................... 502/240, 262, 502/263, 350, 351, 439, 527; 423/213.5

[56] References Cited

U.S. PATENT DOCUMENTS

| | | | |
|---|---|---|---|
| 4,188,309 | 2/1980 | Völker et al. | 252/466 J |
| 4,233,183 | 11/1980 | Inaba et al. | 252/432 |
| 4,271,044 | 6/1981 | Fratzer et al. | 252/462 |
| 4,279,782 | 7/1981 | Champman et al. | 252/465 |
| 4,537,873 | 8/1985 | Kato et al. | 502/242 |
| 4,742,038 | 5/1988 | Matsumoto | 502/303 |
| 5,000,929 | 3/1991 | Horiuchi et al. | |
| 5,422,331 | 6/1995 | Galligan et al. | 502/333 |

FOREIGN PATENT DOCUMENTS

| | | |
|---|---|---|
| 214085 | 3/1987 | European Pat. Off. . |
| 0311515 | 4/1989 | European Pat. Off. . |
| 0377290 | 7/1990 | European Pat. Off. . |
| 3407291 | 9/1985 | Germany . |
| 4-87627 | 3/1992 | Japan . |
| WO90/00439 | 1/1990 | WIPO . |

OTHER PUBLICATIONS

Dialog Information Services, File 351, World Patent Index 81–93, Dialog accession No. 009218221,, WPI acession no. 92–345643/42, Cataler Kogyo KK: "Catalysts for reducing diesel particulates discharge—comprises catalyst supporting layer comprising titanium dioxide and e.g. yttrium oxide formed on support base material, and oxidising catalyst", JP 4250848, A, 920907, 9242 (Basic) (Date Unknown).

*Primary Examiner*—Shrive Beck
*Assistant Examiner*—Timothy H. Meeks
*Attorney, Agent, or Firm*—Oblon, Spivak, McClelland, Maier & Neustadt, P.C.

[57] ABSTRACT

The invention relates to a catalyst intended for purifying diesel exhaust gases, the catalyst comprising a honeycomb and a support which has been prepared by using titanium dioxide and an inorganic sol, and at least one catalytically active agent.

7 Claims, No Drawings

CATALYST AND PROCESS FOR PURIFYING DIESEL EXHAUST GASES

BACKGROUND OF THE INVENTION

1. Field of the Invention

The present invention relates to a catalyst according to the preamble of claim 1 for purifying diesel gases. The invention also relates to a method for the manufacture of a catalyst and to a method for purifying diesel exhaust gases.

2. Description of the Background

The exhaust gases of diesel engines contain nitrogen oxides, carbon monoxide, and hydrocarbons. In addition, diesel exhaust gas contains small amounts of SO: gas, which in the operating conditions of an exhaust gas catalyst tends to form, for example, sulphates, which, when depositing on a surface containing noble metals, will weaken the efficiency of the exhaust gas catalyst. Other compounds which are detrimental for the functioning of a catalyst are lead compounds and phosphorus compounds.

Sulphur dioxide gas in itself does not hamper the functioning of a catalyst. However, in the exhaust gas catalysts in diesel engines, sulphur dioxide gas tends to oxidize, whereby sulphur trioxide is formed, and in a moist environment further sulphate. This, in turn, results in the accumulation of sulphur on the catalyst surface and a weakening of the catalytic action. The accumulation of sulphur on the surface of the catalyst is a serious problem in diesel exhaust gas catalysts.

U.S. Pat. No. 5,000,929 discloses a catalyst in which diesel exhaust gases are purified by using the oxides of palladium, praseodymium, neodymium and samarium, and as a support inorganic oxides. These inorganic oxides include active aluminum oxide, silica, titanium dioxide, zirconium oxide, etc., mentioned in the patent. The operating conditions of the above-mentioned catalyst are a high temperature and an oxidizing atmosphere.

EPO publication 0 377 290 discloses a catalyst which is silica-based and removes impurities from diesel exhaust gases by oxidizing carbon monoxide and hydrocarbons into carbon dioxide and water. Both noble metals and promoters are added to the silica support layer. The promoters include gold chloride, silver nitrate, cerium chloride, etc. By means of the invention, the oxidation of $SO_2$ to $SO_3$ is decreased to a rather low level.

Patent publication WO-90/00439 discloses a method for lowering the light-off temperature of diesel soot. On the surface of the soot filter there is produced a support layer in which, for example, titanium dioxide is used. The surface of the titanium dioxide is impregnated with a noble metal, which may be Pt, Pd or Rh. The light-off temperature of the soot was lowered by means of such a filter.

Patent publication EP-214 085 discloses a method for the production of a catalyst intended for the elimination of $NO_x$ gases. According to the method, the support is prepared by sintering a mixture of orthotitanic acid and silicic acid. Thereby a $TiO_2$ with very small crystals is formed. Instead of silicic acid, or in addition to it, a compound of tungsten or molybdenum may be used in the method. By the use of a catalyst which contains no noble metals and which cannot be used for the purification of diesel exhaust gases, $NO_x$ gases can be removed while the oxidation of $SO_2$ remains insignificant.

The state-of-the-art methods for the manufacture of catalysts have the deficiency that they do not enable production of a noble metal catalyst which would have simultaneously both an efficient conversion of CO and HC gases and a low binding of sulphur, i.e. oxidation of $SO_2$.

SUMMARY OF THE INVENTION

The object of the present invention is to provide a catalyst in which the binding of the sulphur present in diesel exhaust gas to the catalyst is inhibited and which has an effective conversion of CO and HC gases. A further object is a catalytic unit in which the support adheres well to the metal foil. These objects are achieved by means of the catalyst according to the invention, which is mainly characterized in the facts stated in the characterizing clause of claim 1.

According to the invention there is also provided a method for the manufacture of such a catalyst, in which method the carrier forming a honeycomb, for example a metal foil, is coated with a slurry containing titanium dioxide and an inorganic sol, whereafter drying and calcination are carried out in order to form a support on the carrier, and thereafter the support is impregnated with at least one catalytically active agent.

DETAILED DESCRIPTION OF THE PREFERRED EMBODIMENTS

The invention is based on the surprising observation that, when the support used is a mixture made up of titanium dioxide and an inorganic sol, the light-off temperatures of both CO and HC are brought to a sufficiently low level while the oxidation of SO: is prevented, whereupon its accumulation on the surface of the support remains low.

The honeycomb may be of metal or a ceramic material, and preferably it is made of metal foil.

The titanium dioxide used may also be modified, i.e. stabilized, in which case it contains various stabilizers such as compounds of Al, Si, Zr, La, Ba, Y and/or Ce, or mixtures of these compounds. When titanium dioxide in anatase form is the support, the said substances may be added before the kiln treatment in the titanium dioxide production process, in which case they can pass into the crystal lattice of the anatase. This can further be calcined at a higher temperature to rutile. Rutile-form titanium dioxide stabilizes onto the crystal surface. For additives it is possible to use small amounts of, for example, $Al_2O_3$ and/or $SiO_2$, which settle on the surface of An inorganic sol is a suspension made up of finely-divided particles (0.01–0.1 μm) and a liquid. The liquid is usually water. The solid may be in the form of an oxide or hydroxide. According to the invention the sol may be, for example, silica sol ("colloidal silica"), aluminum sol, titanium sol, zirconium sol, or a mixture of these. During calcination, the inorganic sol is converted into an oxide and the size of the crystals increases. The purpose of using a sol is, on the one hand, for the sol to function as an "adhesive" between the crystals of the support by crystallizing adjacently located separate crystals to each other and, on the other hand, to improve the adhesion of the crystals in the support to the crystals on the surface of the metal foil, the latter crystals having been produced by a thermal treatment of the metal foil. The sol is used at 10–80% by weight, preferably at 40–60% by weight, calculated from the dry weight of the support.

During the heating step, the volatile components are removed from the sol of the support layer, and in the end a dry oxide is obtained. By combining, in accordance with the invention, titanium dioxide and the above-mentioned sol; a support is obtained which adheres well to a metal foil and on which sulphur dioxide is not left no a noteworthy degree. The support thus obtained is impregnated by conventional methods with at least one catalytically active agent, in particular a noble metal such as palladium.

As the promoter compound, which may be a salt or a solution, it is possible to use compounds which promote catalytic reactions or retard the ageing of the support and/or of the noble metals. Often promoter compounds in themselves are not sufficiently active catalytically, but together with a catalytically active component they improve the properties of the catalyst. Such compounds include the compounds of the lanthanide group and transition metal compounds.

The support according to the invention remains well on the surface of a metal honeycomb, and it can be used even for a honeycomb with densely spaced openings. The binding of sulphur to the catalyst remains low in this case.

The invention is described below in greater detail, with the help of examples.

Example 1

To prepare a support slurry, 240 g of anatase ($TiO_2$) and 112 g of silica sol (Ludox HS-40), calculated as 40% $SiO_2$, were slurried in water. Both corrugated and flat metal foils were pre-treated and coated with this slurry. Support was used in an amount which was, calculated as dry weight, 40 g/m$^2$ of metal sheen. The support coating was dried at 105° C. and calcined for 4 h at 550° C. The obtained coating was impregnated with palladium by using a palladium tetra-amminedichloride solution so that the Pd concentration obtained for the catalyst was 0.30% Pd as calculated from the weight of the catalyst. Finally calcination for 1 h at 400° C. was performed.

For testing the catalyst, a synthetic diesel exhaust gas having the following composition was used.

| Gas | Concentration |
|---|---|
| $SO_2$ | 0.01% |
| CO | 500 ppm |
| Propylene | 500 ppm |
| $CO_2$ | 10% |
| NO | 1000 ppm |
| $O_2$ | 5% |
| $H_2O$ | 7% |
| $N^2$ | balance |

The space velocity in the catalyst was 50,000 h$^{-1}$. In the test, the light-off temperatures of the catalyst for carbon monoxide and hydrocarbon were measured. By light-off temperature is meant the temperature at which 50% of the gas is oxidized. In addition, the conversion percentages of the gases at 400° C. were measured.

The binding or accumulation of sulphur was measured by using a synthetic diesel exhaust gas (100 ppm $SO_2$, 5% $O_2$, space velocity 10 000 h$^{-1}$, 30 min) by measuring the $SO_2$ concentration continuously at 400° C.

The result of the test was

| | CO | HC |
|---|---|---|
| Light off (50%) | 240° C. | 245° C. |
| Conversion % (400° C.) | 95% | 100% |
| Binding of sulphur | 11% | |

Example 2. (reference example)

A test otherwise similar to that in Example 1 was performed, but the support was prepared by using a mixture of aluminum oxide and aluminum sol.

The result of the test was

| | CO | HC |
|---|---|---|
| Light off (50%) | 200° C. | 250° C. |
| Conversion % (400° C.) | 95% | 100% |
| Binding of sulphur | 75% | |

Example 3

To produce a support slurry, 82.6 g of La-stabilized anatase-form $TiO_2$, 46.7 g of silica sol (Ludox HS-40) and 39.0 g of crystalline La nitrate were slurried in water. The slurry was ground. Thereafter, the same procedures were carried out as in Example 1. According to the analysis, the catalyst obtained had a Pd concentration of 0.36% and a La concentration of 2.5%.

The result of the experiment was

| | CO | HC |
|---|---|---|
| Light off (50%) | 230° C. | 230° C. |
| Conversion % (400° C.) | 95% | 100% |
| Binding of sulphur | 11% | |

The results show that, when the combination according to the invention is used as a support, i.e. titanium oxide and an inorganic sol together, a significant decrease in the binding of sulphur on the catalyst surface is achieved.

The anatase used in Examples 1 and 3 was normal titanium dioxide after the anatase kiln of the titanium dioxide process (sulphate process).

We claim:

1. A method for purifying diesel exhaust gases, which comprises:
   (a) oxidizing diesel exhaust gases by directing said diesel exhaust gases through an oxidation catalyst, and
   (b) inhibiting the accumulation of $SO_2$-oxidation products on a surface of a support for said catalyst, whereby a reduction in $SO_2$-oxidation products is obtained,
   wherein said oxidation catalyst comprises a honeycomb and said support and at least one noble metal, wherein the honeycomb is made of metal foil having crystals on a surface thereof, said crystals being formed by heating the metal foil, and wherein the support is prepared by using a stabilized titanium dioxide to prevent accumulation of sulfur dioxide on the catalyst and an inorganic sol to improve the adhesion of the titanium dioxide particles to each other and to said crystals on the surface of the metal foil.

2. The method of claim 1, wherein said stabilized titanium dioxide is titanium dioxide stabilized using a compound selected from the group consisting of compounds of Al compounds, Si compounds, Zr compounds, La compounds, Y compounds, Ba compounds, and Ce compounds.

3. The method of claim 2, wherein said stabilized titanium dioxide is titanium dioxide stabilized with a barium compound.

4. The method of claim 2, wherein said stabilized titanium dioxide is titanium dioxide stabilized with a lanthanum compound.

5. The method of claim 1, wherein said inorganic sol is a silicon sol, aluminum sol, titanium sol, zirconium sol or a mixture thereof.

6. The method of claim 1, wherein the support for said catalyst comprises at least one component acting as a promoter, the component being selected from the group consisting of a lanthanide compound and a soluble salt of a transition metal.

7. The method of claim 1, wherein said inorganic sol is used in an amount of 10 to 80% by weight based upon the dry weight of the support.

* * * * *

UNITED STATES PATENT AND TRADEMARK OFFICE
CERTIFICATE OF CORRECTION

PATENT NO. : 5,580,533
DATED: : DECEMBER 3, 1996
INVENTOR(S) : MATTI KIVIOJA ET AL

It is certified that error appears in the above-identified patent and that said Letters patent is hereby corrected as shown below:

Column 1, line 14, "of SO: gas" should read --of $SO_2$ gas--.

Column 2, line 29, "of SO: is" should read --of $SO_2$ is--.

Column 2, line 45, after "surface of" insert --rutile.--.

Column 2, line 66, "sol; a" should read --sol, a--.

Column 3, line 1, "left no a" should read --left to a--.

Signed and Sealed this

Twenty-third Day of June, 1998

Attest:

BRUCE LEHMAN

*Attesting Officer*   *Commissioner of Patents and Trademarks*